United States Patent [19]

Irion et al.

[11] 4,043,868
[45] Aug. 23, 1977

[54] WATER-COOLED NUCLEAR REACTOR WITH LOSS-OF-COOLANT PROTECTION

[75] Inventors: Leonhard Irion, Ruckersdorf; Jürgen Tautz, Erlangen; Gerhard Ulrych, Erlangen-Tennenlohe, all of Germany

[73] Assignee: Kraftwerk Union Aktiengesellschaft, Mulheim (Ruhr), Germany

[21] Appl. No.: 627,206

[22] Filed: Oct. 30, 1975

[30] Foreign Application Priority Data

Nov. 20, 1974 Germany .............................. 2455060

[51] Int. Cl.² .............................................. G21C 9/00
[52] U.S. Cl. ...................................... 176/50; 176/38; 176/61
[58] Field of Search .................... 176/50, 61, 38; 137/512.1, 507

[56] References Cited

U.S. PATENT DOCUMENTS

| | | | |
|---|---|---|---|
| 3,118,467 | 1/1964 | Kuhn | 137/512.1 |
| 3,357,892 | 12/1967 | Schmidt | 176/38 |
| 3,420,737 | 1/1969 | Marchal et al. | 176/61 |
| 3,483,824 | 12/1969 | Sprague | 137/512.1 |
| 3,623,948 | 11/1971 | Dotson et al. | 176/50 |
| 3,713,969 | 1/1973 | Cahill, Jr. | 176/50 |
| 3,821,079 | 6/1974 | Jabsen | 176/61 |
| 3,850,796 | 1/1974 | Thome | 176/50 |

FOREIGN PATENT DOCUMENTS

| | | | |
|---|---|---|---|
| 1,096,026 | 12/1967 | United Kingdom | 176/61 |

*Primary Examiner*—Harvey E. Behrend
*Attorney, Agent, or Firm*—Kenyon & Kenyon, Reilly, Carr & Chapin

[57] ABSTRACT

A pressurized-water reactor pressure vessel has a plurality of inlet openings through which coolant is introduced from the cold legs of a plurality of main coolant loops, into an annular descent space of restricted radial extent and formed between the inside of the vessel's side wall and the outside of a core barrel on the inside of the vessel. To prevent outward loss of coolant from the vessel in the event of a break in any of the cold legs, the vessel is internally provided with a check valve assembly for each of the inlet openings, and to avoid restriction of the normal inlet coolant flow rate, each assembly comprises a plurality or series of flap valves which are each individually of small dimensions so that they can be fitted into the descent space. Therefore, these flap valves are normally held open by the inlet coolant flow but can snap shut to outward coolant flow. Due to their small dimensions, they are very sensitive to coolant flow in the descent space through the vessel's various inlet openings making it possible for some of these valves to flutter between fully open and partially closed or fully closed positions in regions of low coolant flow velocity. To prevent this fluttering possibility, each valve assembly comprises means for forming a flow-confining chamber extending downwardly from the coolant inlet opening involved, and having an open lower end substantially conforming in contour to a segment of the annular descent space, the flap valves being mounted in the form of a row in this open lower end of the chamber. In this way, the flow is directed in a predeterminable manner also in case of a break, so that the flap valves associated with the broken pipe definitely close and are prevented from fluttering.

6 Claims, 5 Drawing Figures

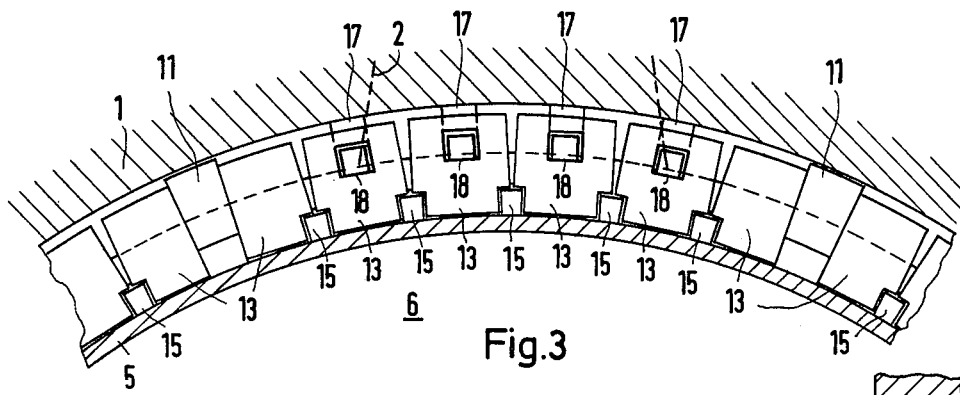
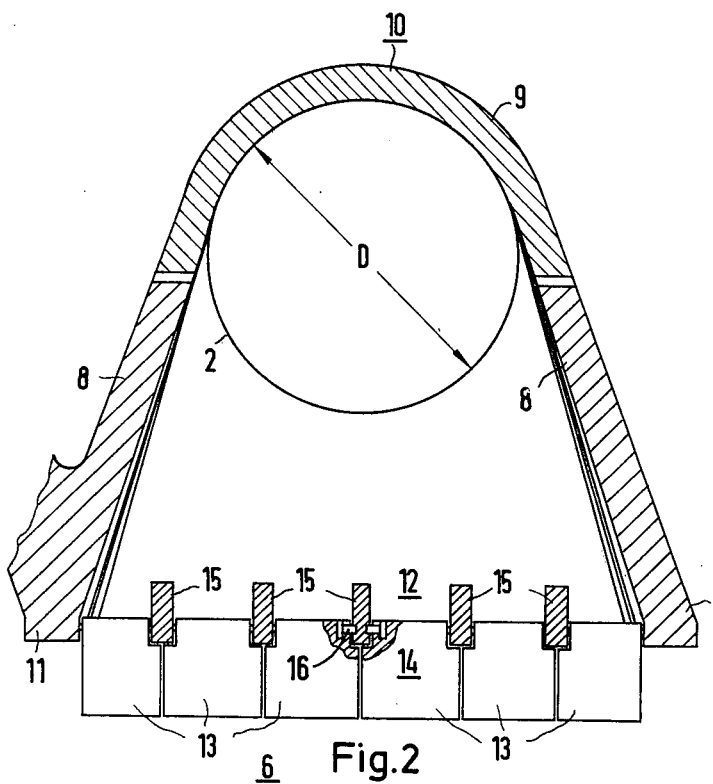
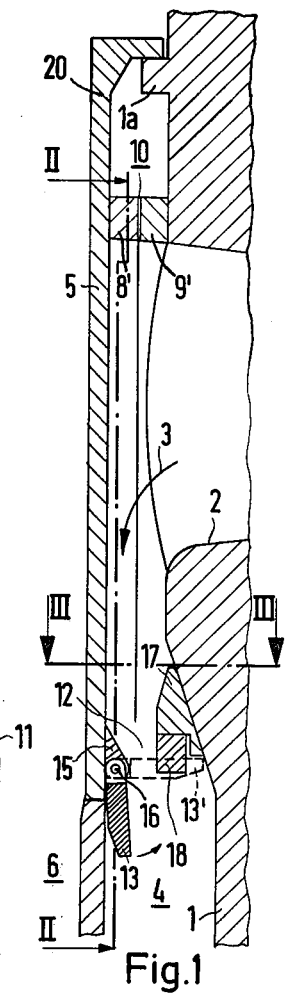

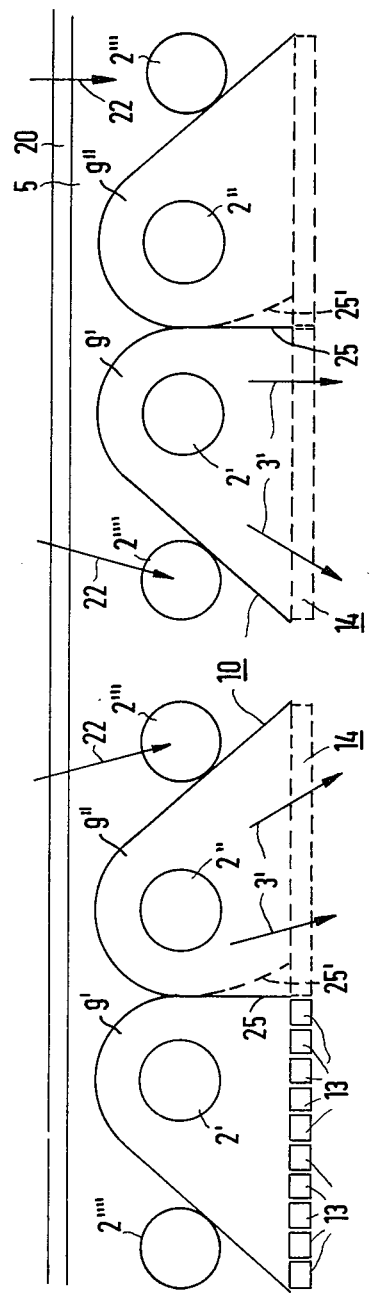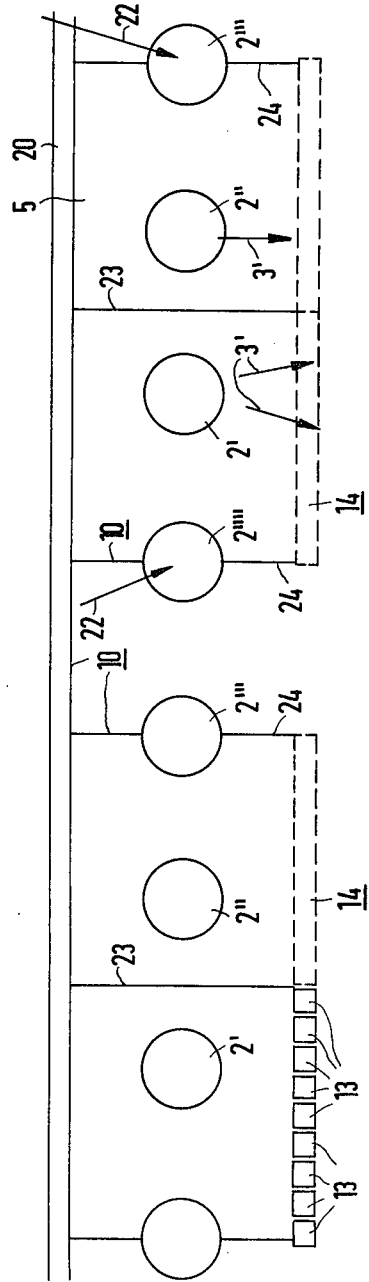

WATER-COOLED NUCLEAR REACTOR WITH LOSS-OF-COOLANT PROTECTION

BACKGROUND OF THE INVENTION

A typical, currently-used, pressurized-water reactor comprises a pressure vessel having a vertically substantially cylindrical side wall having an inside; and a vertically substantially cylindrical core barrel having an outside; the vessel's inside and the core barrel's outside being radially interspaced and forming therebetween an annular, coolant descent space; the vessel's side wall having a plurality of coolant inlet openings interspaced circumferentially with respect to the side wall and through which openings coolant normally flows into the descent space. This coolant comes from the cold legs of main coolant loops of the reactor.

The top end of the core barrel has an external flange above such coolant inlet openings and which rests on an internal flange provided on the vessel's inside, this arrangement supporting the core barrel and also closing the top of the annular descent space. The core barrel contains the reactor core and various equipment above the core, the introduced coolant flowing downwardly through the descent space and upwardly through the inside of the core barrel the latter having a plurality of coolant outlet connections which open from the inside of the core barrel, span the radial descent space and connect with the hot legs of the main coolant loops. The outlet flows are, therefore, separated from the inlet flows throughout the downward extend of the annular descent space.

In the event of a break in one of the cold legs, the coolant in the vessel, being under high pressure, can rapidly discharge backwardly through the inlet opening for the broken cold leg, thus possibly emptying the pressure vessel from the coolant and resulting in a dangerous situation unless the core is scrammed and an emergency core cooling system can be operated immediately.

With the above in mind, U.S. Braun et al application Ser. No. 577,874, filed May 15, 1975, discloses a check valve assembly for the inlet opening of each of the cold legs, the assembly being positioned on the inside of the pressure vessel in the radially restricted descent space between the vessel's inside and the core barrel's outside. To provide a coolant flow area of adequate size, each assembly comprises a plurality of individually swinging flap valves and means for mounting these flap valves in the form of a series encircling the coolant inlet opening, and, of course, so that the coolant flow through the opening must pass through these flap valves. The flap valves are normally held open by inward flow but snapping shut to outward flow, thus protecting the pressure vessel against excessive loss of coolant in the event of a break in the main coolant loop, feeding that inlet opening. Because each flap valve is of small surface area and overall dimensions, each flap valve is individually light in weight, this having the advantage that in the event of a break in the cold leg, the valves snap shut with extreme rapidity.

However, it has been found that in case of a break coolant flows in the descent space at the circumferentially interspaced locations for the various coolant inlet openings, tends to be a random and ambiguous flow in the vicinities of the valve assemblies and that due to the great sensitivity of the flap valves, some of the flap valves of the valve assemblies, can possibly tend to flutter between their normal full open positions and partially or wholly closed positions.

The object of the present invention is to solve the problem presented by the above flap-valve fluttering possibility.

SUMMARY OF THE INVENTION

According to the present invention, each such check valve assembly comprises a means for forming a flow-confining chamber extending downwardly from the coolant inlet opening and having an open lower end substantially conforming in contour to a segment of the descent space. Preferably the entire chamber is throughout made to conform to the annular descent space in the circumferential direction of the latter, with the chamber extending vertically downwardly to its lower open end. With this arrangement, the series of flap valves are mounted in the form of a row which, instead of being a circular row or series as before, is now a row which extends in a horizontal plane and conforms to the annular descent space throughout the extent of the chamber's lower end which is, of course, closed by the row of flap valves in the event of a break in the cold leg connecting with the descent space through the valve assembly.

With this new arrangement, the incoming coolant flow is, in each instance, guided downwardly to the row of flap valves so that the latter receive an unambiguous flow of coolant which is uniformly downwardly, thus holding the flap valves positively open under normal reactor operating conditions. At the same time, a positive and quick-acting check valve operation of the construction disclosed by the Braun et al application, is retained.

In this new construction, the chamber of each valve assembly, has an upper end symmetrically surrounding the vessel's inlet opening, and downwardly from this upper end, flares in the circumferential direction of the descent space, to the chamber's lower end. If such a flaring construction is not used, the lower end of the chamber should extend circumferentially with respect to the annular descent space, for a distance that is at least equal to the diameter of the coolant inlet opening. With the flaring construction the lower end may thus extend up to three times the diameter of the inlet opening. Also, preferably the row of flap valves should comprise at least five of the flap valves. These flap valves are pivoted to swing transversely with respect to the annular space and about a common axis which extends in the annular direction of the descent space, their swinging lengths being restricted by the radial dimension of the annular descent space.

Such a flaring chamber construction is relatively expensive. Normally the coolant inlet passages through the vessel's wall are formed as pairs of relatively adjacent openings, and expense can be reduced by making the chambers as two pairs with a common dividing wall between them. At each dividing wall, baffle walls can be provided so that each chamber extends diagonally with respect to the vertical axis of the annular descent space, this possibly having the advantage that the incoming coolant enters the descent space in a somewhat tangential direction, causing swirling of the coolant in the descent space below the chambers of the various valve assemblies.

For maximum economy, the chambers may be formed by straight vertical walls which extend from the flanges closing the top of the descent space, downwardly to form the open lower ends in which the row or rows of flap valves are mounted.

In any event, the downward extents or downward lengths of the chambers depends on the degree of inlet coolant flow separation, via the various inlets, required to positively prevent flap-valve fluttering. As a general rule to follow, the downward extent of the flow chambers should be a length about two-thirds of the diameter of the inlet opening, in each instance, this having reference to the distance between a bottom of an inlet opening and the lower end or opening of the chamber. In this way the coolant flows are guided to an adequate extent to prevent the flow through one of the chambers from interfering with or causing fluttering of the flap valves of an adjacent valve assembly.

BRIEF DESCRIPTION OF THE DRAWINGS

Specific examples of the present invention are illustrated by the accompanying drawings, in which:

FIG. 1 is a vertical section taken centrally through one of the valve assemblies and the adjacent portions of the pressure vessel wall and core barrel;

FIG. 2 is a vertical cross section taken on the line II—II in FIG. 1;

FIG. 3 is a horizontal cross section taken on the line III—III in FIG. 1;

FIG. 4 schematically and as a linear development, shows the manner in which adjacent valve assemblies may be associated in the case of the flaring type of chamber; and FIG. 5 is the same as FIG. 4, excepting that it shows an example of the use of the plain straight vertical chamber walls previously referred to.

DETAILED DESCRIPTION OF THE INVENTION

Having reference to the above drawings, FIGS. 1 to 3 show the steel side wall 1, normally substantially cylindrical and vertical, of a pressurized-water reactor pressure vessel, one of the vessel's coolant inlet openings being shown at 2 while the coolant inlet flow is indicated by the arrow 3, this flow going downwardly in the descent space 4 formed between the inside of the pressure vessel wall 1 and the outside of a core barrel 5, the latter containing the core and other accessories (not shown), the core barrel being supported vertically by having an external flange 5a which rests on an internal flange 1a formed by the vessel's side wall. Thus, the descent space 4 is closed at its top, and although not shown, at its bottom the core barrel is open so that coolant descending, as at 3, can at the bottom of the pressure vessel (not shown), reverse itself and travel up through the inside of the core barrel 5.

As is well known, after the incoming coolant descends to the bottom of the descent space 4, it flows inwardly and upwardly through the inside of the core barrel 5 in the space indicated at 6 in FIG. 1, and out through what are, in this case, four outlet nozzles. Briefly, having reference to FIGS. 4 and 5, the inlet openings are circumferentially spaced relatively closely together in the form of pairs as shown at 2' and 2", in FIGS. 4 and 5. The outgoing coolant, feeding the hot legs of the main coolant loops, leaves the vessel through outlet openings positioned on the opposite sides of each two or pair of inlet openings, as shown at 2''' and 2'''' in FIG. 4. Although not illustrated specifically, the outlet flow is from the inside 6 of the core barrel 6 through connections which span the descent space 4 and connect with the outlet openings, the inflow and outflow of coolant being, therefore, completely separated from each other insofar as their flow paths are concerned.

To prevent the flow from one inlet nozzle interfering with the check valve assembly of another nozzle, as previously described, a chamber is provided and which is, in this instance, formed by a downwardly flaring portion 8 depending from a semicircular upper portion 9 to form the chamber 10 previously referred to and internally providing downwardly extending flow-directing surfaces. The upper portion 9 surrounds about one-half of the circular inlet opening 2 and is symmetrically disposed around the latter. Although the core is not shown, the lower end 11 of the chamber may reach to about the top level of the core, in many instances.

For easier construction of the chamber walls, the parts 8 and 9 may be formed as radially abutting parts, indicated at 8' and 9' in FIG. 1, contoured to follow the annular shape of the descent space 4. The parts 8 and 9 may be, in effect, baffles closing the radial descent space 4 with the inside of the pressure vessel wall and the outside of the core barrel 5 forming the inner and outer walls of the chamber.

Each chamber at its lower end 11 forms a semicircular aperture 12 which faces downwardly and which can be closed off by the individual valves 13 of a row 14 of the valves. The length of the aperture 12, in this instance, in the circumferential direction of the descent space 4, is in the neighborhood of two times the radius of the inlet opening 2. (see $\theta$)

The individual flap valves 13 are pivoted by supports 15 formed as a series on the inside of the core barrel 5, the pivot pins 16 being axially aligned circumferentially. It would also be possible to pivot the various flap valves by a mounting forming as part of the bottom 11 of the chamber, such an arrangement not being shown.

The inside of the pressure vessel wall mounts a series of abutments 17 for limiting the closing swing of the flap valves, indicated at 13' in FIG. 1 by broken lines. Preferably these abutments are provided with deformable metal bodies 18 which damp the impact of the rapid or snap-closing of the flap valves which occur in the event of an accidental loss of coolant pressure at the inlet opening 2.

Both FIGS. 2 and 3 show the symmetrical and uniform arrangement of the individual flap valves. The abutments 17–18 are shown as engaging the central portion of each flap valve. Although not shown, these abutment members can be positioned between each two adjacent ones of the flap valves, thus closing to a substantial extent the otherwise triangular spaces formed between the flap valves, the latter being rectangular in contour. It is to be understood that when the flap valves close, they need not be literally fluid-tight; it is only required that the outward rush of coolant occurring in the event of an accident, be checked to give time for scramming of the core and operation of the emergency core cooling system.

In FIG. 4 the various chambers are shown as being positioned as pairs, one for each pair of coolant inlet openings 2' and 2". Each two chambers share a common wall 25, the chambers flaring oppositely from each other. In this case the upper ends 9' and 9" symmetrically encircle the openings 2' and 2" and are radially spaced therefrom, possibly providing for an inlet flow with less interference. In this case each chamber provides for ten flap valves 13. The adjacent ones of the two pairs of chambers provide declining sides offering clearance for the passage of the hot leg connections 2''' and 2'''' which extend through the annular descent space, permitting a smooth flow of the outgoing coolant, indicated at 22 in FIGS. 4 and 5, to the coolant outlet openings. This flow can occur both from above the core barrel having its descent space closed by the flanges 20 and 21a, as well as radially outwardly from above the core.

In FIG. 4 baffles are indicated at 25' which angle in the direction of the opposite sides of the chambers, this resulting in the chamber's pointing diagonally into the descent space with respect to the vertical axes of the descent space, this introducing the possibility of a somewhat tangential injection of coolant into the descent space with a consequent swirling action in this space. These baffles 25' may be formed also by a corresponding contour on the part of the chamber walls themselves, in which case such two chambers do not completely share a common dividing wall.

For a less expensive construction, FIG. 5 shows plain, straight, unshaped vertical fins or baffle walls 23 and 24 as forming the chambers of the present invention. At the outlet connections 2''' and 2'''', the outermost fins or baffles 24 can be welded directly to the coolant outlet connections which extend through the annular descent space. Although effective, this more economical arrangement does not provide for the same smooth flow deflection as is obtained in the case of the flaring chamber arrangements.

Returning to FIG. 4, in the case of the diagonal injection arrangement formed by the baffle 25' and the opposite wall of the flow-guiding chamber of the present invention, an angularity of approximately 20° relative to the vertical axis of the annular space, is suggested. Each pair of chambers provides the same angularity, and the adjacent chambers of the two pairs do the same. In this way there is a general unidirectional rotation of the coolant descending in the descent space, which provides a good intermixing of the coolant flows so that at the bottom of the descent space the coolant temperature is relatively uniform throughout.

What is claimed is:

1. A water-cooled reactor comprising a pressure vessel having a vertical, substantially cylindrical side wall having an inside; a vertical, substantially cylindrical core barrel having an outside and upper and lower ends; said inside and outside being radially interspaced and forming therebetween an annular, coolant descent space; said side wall having a plurality of coolant inlet openings adjacent to said upper end of said core barrel and interspaced circumferentially with respect to the side wall and through which openings coolant normally flows into said descent space; and for each one of said openings, a check-valve assembly comprising a row of individually-swinging flap valves and means for positioning said row so that coolant flow through the opening must pass through the flap valves; said flap valves being normally held open by inward coolant flow through the opening into said descent space and closing in the event coolant starts to flow outwardly through the opening from the descent space: wherein the improvement comprises said means being in each instance a chamber open to and extending downwardly from the coolant inlet opening and having an open lower end positioned above the core barrel's said lower end and substantially conforming in contour to a segment of said descent space, said chamber having means for mounting said row of flap valves in its said open lower end so that coolant flow through the chamber's said open lower end must pass through the flap valves, said chamber having side walls confining coolant flow through the chamber to a downward direction.

2. the reactor of claim 1 in which the vessel's said inlet opening has a diameter and the chamber's said lower end extends circumferentially with respect to said annular descent space for a distance of from one to three times said diameter.

3. The reactor of claim 2 in which said chamber has an upper end substantially symmetrically surrounding the inlet opening and downwardly from said upper end, said chamber flares in the circumferential direction of said descent space, to the chamber's said lower end, said row comprising at least five of said flap valves.

4. The reactor of claim 3 in which said descent space has a vertical axis and said chamber extends in a direction which is vertical with respect to said axis.

5. The reactor of claim 3 in which said descent space has a vertical axis and said chamber extends in a direction which is diagonal with respect to said axis.

6. The reactor of claim 3 in which at least two of the vessel's said inlet openings are adjacent to each other circumferentially with respect to said descent space, and said means includes a common wall for two chambers of said two inlet openings, which common wall extends downwardly from the upper ends of said two chambers substantially to the lower ends of said two chambers.

* * * * *